Jan. 19, 1937  E. R. BERGMANN  2,068,592
SHAKER CONVEYER
Filed Aug. 12, 1935   2 Sheets-Sheet 1
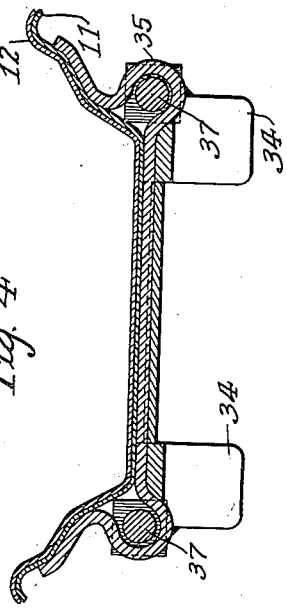
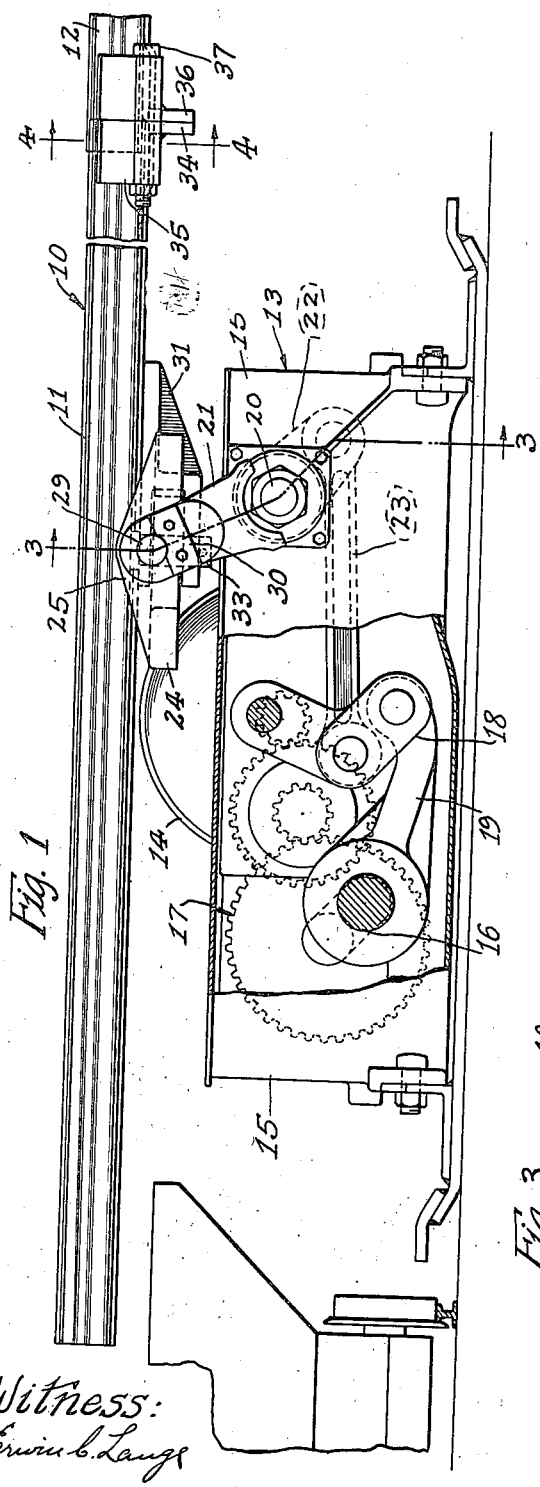
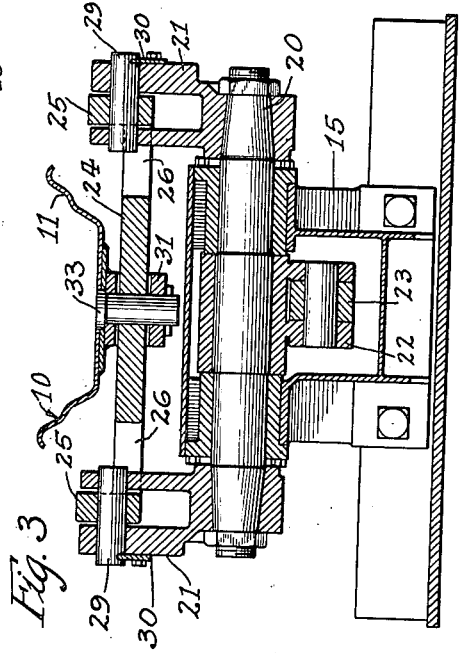
Witness:
Erwin C. Lange
Inventor:
Ernst R. Bergmann
Clarence F. Poole
Attorney

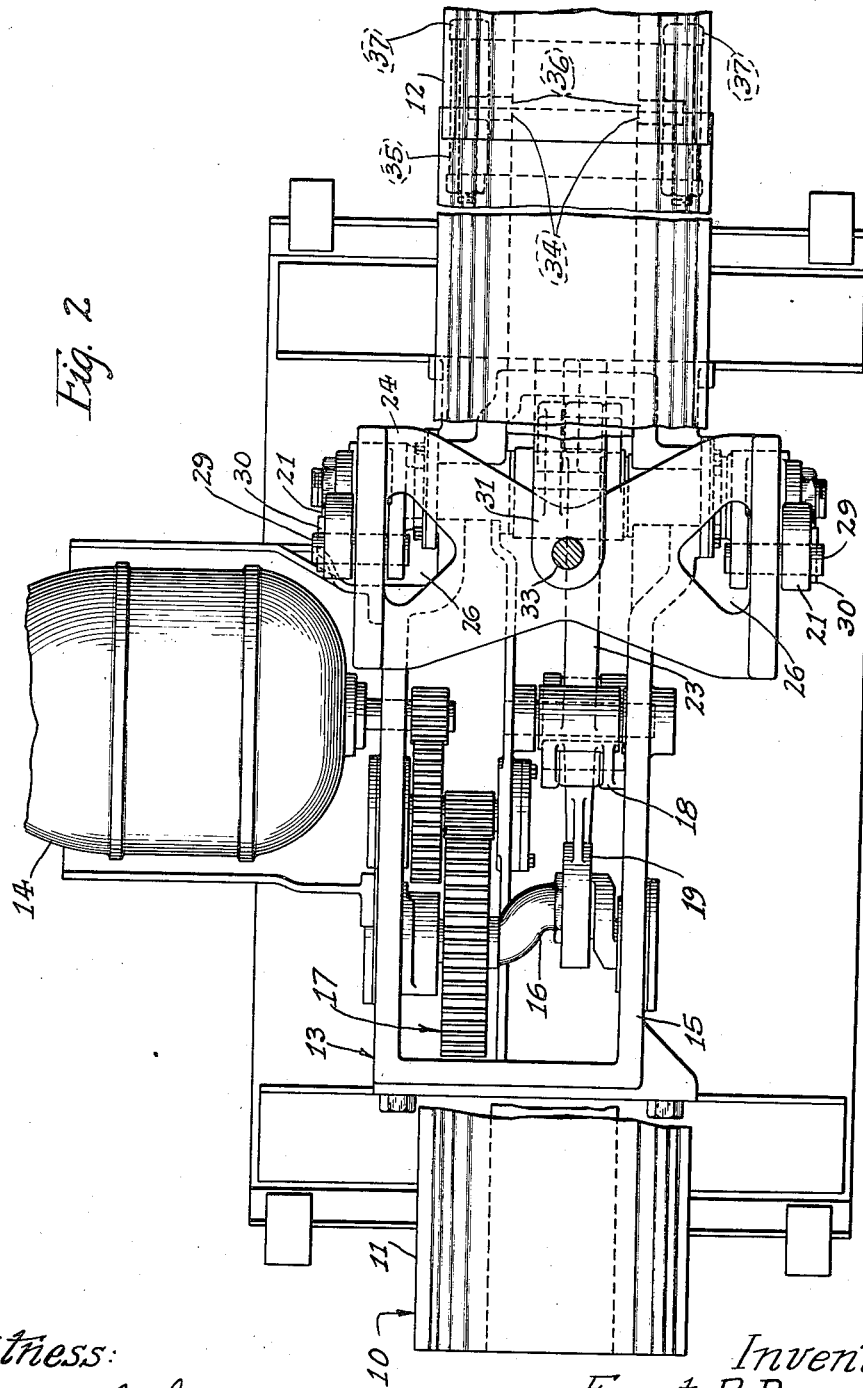

Patented Jan. 19, 1937

2,068,592

UNITED STATES PATENT OFFICE 2,068,592

SHAKER CONVEYER

Ernst R. Bergmann, Chicago, Ill., assignor to Goodman Manufacturing Company, Chicago, Ill., a corporation of Illinois Application August 12, 1935, Serial No. 35,802

5 Claims. (Cl. 198—220)

This invention relates to improvements in shaker conveyers and has as one of its objects to provide a novel connecting device between the drive unit and the conveyer pan line for driving the conveyer pan line directly from the drive unit, which device forms a support for a portion of the pan line and is so arranged as to permit the pan line to be driven when in misalignment with the drive mechanism. Another object of my invention is to provide a drive connection of the class described which is arranged to eliminate supporting and connecting guide frames between the trough sections adjacent the drive, and provide a connection between the trough sections which will prevent buckling thereof.

Heretofore, conveyer pan lines have usually been reciprocably driven by means of a puller rod or a pair of puller rods connected between the drive mechanism and one of the troughs in the conveyer pan line. In order to properly drive the pan line and prevent breakage of the puller rods it is essential that the conveyer pan line be accurately aligned with the drive and be kept in such alignment during the driving operation. This requires a number of relatively heavy guide frames and trough supports which take time to set up and keep in alignment, and which increase the initial cost of the drive and the maintenance thereof. Other driving connections have been provided which permit the trough to be driven when in misalignment with the drive, but these connecting means increase the weight of the pan line and do not eliminate the trough supports for the pan line.

The device of my invention forms a support for the portion of the pan line adjacent the drive mechanism and eliminates trough guiding means for holding the pan line in alignment with the drive and provides a simplified driving connection to the pan line which will efficiently drive the pan line when in misalignment with the drive mechanism.

Other objects of my invention will appear from time to time as the accompanying specification proceeds.

My invention may best be understood by referring to the accompanying drawings in which:

Figure 1 is a side elevation of a shaker conveyer, showing the pan line connected to the conveyer drive mechanism, with parts of the conveyer drive mechanism broken away and shown in vertical section;

Figure 2 is a top plan view of a shaker conveyer pan line similar to that shown in Figure 1, with a portion of the conveyer trough broken away and the cover for the drive mechanism removed in order to clearly illustrate certain details of my invention;

Figure 3 is a sectional view taken substantially along line 3—3 of Figure 1; and Figure 4 is a sectional view taken substantially along line 4—4 of Figure 1.

In the drawings, 10 indicates a shaker conveyer pan line which consists of a plurality of conveyer trough sections 11 and 12 suitably connected together in a manner which will hereinafter be more fully described. Said pan line as herein shown is supported on and reciprocably driven at a predetermined variable acceleration during different portions of the forward and return stroke by a driving mechanism indicated generally by reference character 13. Said drive mechanism, as herein shown, is disposed adjacent the discharge end of said pan line beneath said pan line, so that said discharge end may be disposed above a suitable receptacle, such as a mine car, for the discharge of material therein.

The drive mechanism 13 may be of any ordinary construction which will convert rotary motion into reciprocatory motion with a predetermined variable acceleration and deceleration occurring at certain portions of the forward and return stroke. As herein shown, said drive mechanism includes a motor 14 mounted on the outside of a frame 15 and disposed to one side thereof. The shaft of said motor extends within said frame, and said frame forms a support means and housing for the conveyer drive mechanism. A rotating crank 16 is driven by said motor through a gear train, generally indicated by reference character 17. Said crank in turn reciprocably drives a rocking member 18 by means of a pitman 19. A shaft 20 is journaled in the forward portion of the frame 15 and extends transversely thereof. The ends of said shaft extend outside of said frame and have rocking arms 21, 21 secured thereto and extending upwardly therefrom. Said shaft is rocked by a rocking member 22 depending therefrom intermediate the ends thereof which rocking member is driven from the rocking member 18 by means of a connecting rod 23.

Referring now to several of the novel features of my invention and the drive from the rocking arms 21, 21 to the trough 11, the upper ends of said rocking arms are of a bifurcated formation. A yoke 24 extends transversely of the trough 11 and is provided with upstanding sides 25, 25 and openings 26, 26 on the insides of said side walls. Said openings are adapted to receive the inner forked ends of said rocking arms. Said yoke is adapted to be pivotally connected with said rocking arms on a center line extending transversely of the conveyer trough 11 by means of pivotal pins 29, 29 extending through the bifurcated portion of said rocking members and said side walls. Said pins are held in position with respect to said side walls by means of plates 30, 30 secured to the outer side of said rocking member by suitable cap screws in an ordinary manner. Said plates are adapted to engage suitable slots formed adjacent the outer ends of said pins.

A clevis member 31 is secured to and depends from the central portion of the trough section 11 and the opening in said clevis member extends toward the discharge end of said trough section. The yoke 24 is adapted to extend within said clevis and forms a support means for said clevis and the trough section 11. Said yoke and clevis are pivotally connected together by means of a pivotal pin 33 extending through said clevis and the center of said yoke.

It may thus be seen that the trough sections 11 and 12 are supported on the conveyer drive mechanism 13 by means of the yoke 24 and clevis member 31 and that the arrangement is such that said trough section may be pivotally moved with respect to said drive mechanism about an axis extending transversely of the drive and an axis perpendicular to said transverse axis, so that the pan line may be reciprocably driven by the conveyer drive mechanism when in a misaligned position with respect thereto.

Suitable means are provided to prevent the trough sections 11 and 12 from buckling with respect to each other, so that the connecting frames or other holding means for effecting the same result may be dispensed with. Said means as herein shown includes a pair of parallel-spaced angles 34, 34 secured to the undersurface of an eye-piece 35 extending across the bottom of the end of the conveyer trough section 11 adjacent the trough 12. Said angles extend inwardly of said eye-piece and are so arranged that one of their legs may depend from said conveyer trough section. Another set of angles 36, 36 depends from the next adjacent trough section 12 and is secured thereto in a manner similar to the angles 34, 34. Said angles are so arranged that their depending legs may abut each other and be held in abutting relation with respect to each other by means of suitable connecting bolts 37, 37 which connecting bolts form a means for connecting the conveyer trough sections together in the usual manner. Thus, when said angles are held in abutting relation with respect to each other, they form a rigid connection between the trough sections to prevent buckling thereof.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a shaker conveyer, a conveyer trough, drive mechanism adapted to impart a reciprocating conveying motion to said conveyer trough including a frame and a pair of parallel-spaced rocking members on said frame, and means for supporting said conveyer trough directly on and between said rocking members for driving said trough when in an aligned or misaligned position with respect to said drive mechanism comprising a yoke pivotally connected to said rocking members and a vertical pivotal connection from said yoke to said conveyer trough.

2. In a shaker conveyer, a conveyer trough, drive mechanism adapted to impart a reciprocating conveying motion to said conveyer trough including a frame and a pair of parallel-spaced rocking members on said frame, and means for supporting said conveyer trough directly on and between said rocking members for driving said trough when in an aligned or misaligned position with respect to said drive mechanism comprising a yoke pivotally connected between said rocking members for pivotal movement with respect thereto about a horizontal transverse axis and a vertical pivotal connection between said yoke and conveyer trough.

3. In a shaker conveyer, a conveyer trough, drive mechanism adapted to impart a reciprocating conveying motion to said conveyer trough including a frame and a pair of parallel-spaced rocking members on said frame, and means for supporting said conveyer trough directly on and between said rocking members for driving said trough when in an aligned or misaligned position with respect to said drive mechanism comprising a yoke pivotally connected between said rocking members adjacent its ends for pivotal movement with respect thereto about a horizontal transverse axis, and a vertical pivotal connection between said yoke and conveyer trough including a pin disposed perpendicular to said transverse axis pivotally connecting said conveyer trough with said yoke adjacent the central portion thereof.

4. In a shaker conveyer, a conveyer trough, drive mechanism adapted to impart a reciprocating conveying motion to said conveyer trough including a frame and a pair of parallel-spaced rocking members on said frame, and means for supporting said conveyer trough directly on and between said rocking members for driving said trough when in an aligned or misaligned position with respect to said drive mechanism comprising a yoke pivotally connected between said rocking members, adjacent its ends, for pivotal movement with respect thereto about a horizontal transverse axis, a bracket secured to and depending from the central portion of said conveyer trough, said bracket having a slot formed therein adapted to register with said yoke and a pin pivotally connecting said bracket with said yoke.

5. In a shaker conveyer, a conveyer trough, drive mechanism adapted to impart a reciprocating conveying motion to said conveyer trough including a frame and a pair of parallel-spaced rocking members on said frame, and means for supporting said conveyer trough directly on and between said rocking members for driving said trough when in an aligned or misaligned position with respect to said drive mechanism comprising a yoke pivotally connected between said rocking members, adjacent its ends, for pivotal movement with respect thereto about a horizontal transverse axis, a bracket secured to and depending from the central portion of said conveyer trough, said bracket having a slot formed therein adapted to register with said yoke and a pin disposed perpendicular to the pivotal axis of said yoke and extending through said bracket and yoke for pivotally connecting said conveyer trough to said yoke.

ERNST R. BERGMANN.